(12) United States Patent  
Kohanim et al.

(10) Patent No.: US 8,548,846 B2  
(45) Date of Patent: Oct. 1, 2013

(54) SYSTEM AND METHOD FOR ONLINE TARGETED BILLBOARD ADVERTISING

(75) Inventors: Greg A. Kohanim, Issaquah, WA (US); Christine A. Jefson, Seattle, WA (US); George C. Young, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 2420 days.

(21) Appl. No.: 11/009,709

(22) Filed: Dec. 13, 2004

(65) Prior Publication Data

US 2006/0129451 A1    Jun. 15, 2006

(51) Int. Cl.  
*G06Q 30/00*    (2012.01)

(52) U.S. Cl.  
USPC ........................................ 705/14.1

(58) Field of Classification Search  
USPC .................................. 705/14, 14.1  
See application file for complete search history.

(56) References Cited

U.S. PATENT DOCUMENTS

2001/0047294 A1* 11/2001 Rothschild ...................... 705/14  
2004/0186766 A1*  9/2004 Fellenstein et al. ............. 705/14

* cited by examiner

*Primary Examiner* — Daniel Lastra  
(74) *Attorney, Agent, or Firm* — Shook Hardy & Bacon LLP

(57) ABSTRACT

A system and method are provided for delivering a message while simultaneously promoting a brand in a trusted online environment. The system may include a sponsor selection mechanism for allowing a communicating user to select at least one sponsor from a list of provided sponsors. The system may additionally include a text input area for allowing the communicating user to input text for display in conjunction with the selected sponsor and a target user selection mechanism for allowing the advertising user to select at least one target user for receipt of the selected sponsor display and the input text in a billboard advertisement.

19 Claims, 6 Drawing Sheets

MSN Billboard Service 600

Billboard Message: 602

<Billboard text goes here>

Billboard Schedule: 604
☐ I want this billboard to start on a specific day:
Select Start Date:

☐ I want this billboard to expire before <start date + 1 mo>:
Select Expiration date:

Billboard Recipients: 606
Billboard Buddy List
Select:  Online
  ☐     Christine Jefson
  ☐     Timothy DeHan
  ☐     Wenbo Shao
         Not Online
  ☐     Arian Gibson

Billboard Sponsors: 608

○ NIKETOWN.COM
○ DELL
○ hp
○ Gateway
○ Neiman Marcus
○ NORDSTROM
○ ORVIS
○ Cabela's HUNTING · FISHING OUTDOOR GEAR

FIG. 6

SYSTEM AND METHOD FOR ONLINE TARGETED BILLBOARD ADVERTISING

CROSS-REFERENCE TO RELATED APPLICATIONS

None.

STATEMENT REGARDING FEDERALLY SPONSORED RESEARCH OR DEVELOPMENT

None.

TECHNICAL FIELD

Embodiments of the present invention relate to a system and method for facilitating targeted online advertisement of products and services through an online service provider.

BACKGROUND OF THE INVENTION

Users of online services are targeted increasingly by advertisers attempting to market products and services. Users have become dissatisfied with the commercialization of the Internet. Online advertising is so prevalent that users have adapted to it and largely tune out unsolicited advertisements, thus reducing the effectiveness of online advertising campaigns. The reduced effectiveness is exemplified in the low click-through rate, which has been less than two percent in many instances.

Given the lack of perceived relevance and lack of user acknowledgement of current advertisements, brand advertisers have shifted towards more intrusive forms of advertising. Intrusive forms of advertising have jeopardized the overall user experience. User loyalty to online services has also been negatively impacted and attrition has been rapid, thereby limiting the overall effectiveness of branding campaigns executed through online services.

Today, online publishers, such as AOL, MSN, and others struggle to accurately represent and market the identity of the user base to drive value and relevance in direct and brand marketing campaigns. Accordingly, a solution is needed that overcomes the drawbacks and shortcomings of the prior art by providing a system and method for enabling users to directly market products and services over the internet and simultaneously illustrate personal and/or group identity. By posting advertisements to their own personal contacts, users would be enabled to promote a sense of group identity while simultaneously promoting a product. Furthermore, a solution is needed for promoting products and group identities within a trusted online environment.

BRIEF SUMMARY OF THE INVENTION

Embodiments of the present invention include a method for providing a billboard advertisement through an online service, the billboard advertisement composed by an advertising user. The method includes displaying an interface to the advertising user. The interface includes a sponsor selection mechanism for allowing selection of a billboard sponsor from a list of billboard sponsors and a target user selection mechanism for allowing selection by the advertising user of at least one target user. The interface additionally includes a text input region for receiving an input message from the advertising user. The method also includes processing information input to the displayed interface to create the billboard advertisement and composing the billboard advertisement including the input message and the at least one selected billboard sponsor for rendering and delivery to the at least one selected target user.

In an additional aspect, a system is provided for delivering a message while simultaneously promoting a brand. The system includes a sponsor selection mechanism for allowing a communicating user to select at least one sponsor from a list of provided sponsors and a text input area for allowing the communicating user to input text for display in conjunction with the selected sponsor. The system additionally includes a target user selection mechanism for allowing the communicating user to select at least one target user for receipt of the selected sponsor display and the input text in a billboard advertisement.

In yet a further aspect, a billboard advertisement creation system is provided. The system includes a billboard creation website for receiving user input including at least one selected sponsor and at least one target recipient. The system additionally includes a billboard database for receiving created billboard information from the billboard creation website and a billboard publication service for obtaining billboard information from the billboard database for publication. The system additionally includes a billboard composition service for preparing the billboard advertisement for rendering.

BRIEF DESCRIPTION OF THE DRAWINGS

The present invention is described in detail below with reference to the attached drawings figures, wherein:

FIG. 6 illustrates a user interface for creating a targeted billboard advertisement an in accordance with embodiments of the invention.

DETAILED DESCRIPTION OF THE INVENTION

I. System Overview

Embodiments of the invention are directed to a system and method for enabling users to market products and services using an online billboard that functions as a targeted advertisement in a trusted online environment. End users become direct marketers for products and services via their own personal contacts on stored contact or mail lists. The system of the invention enables a user of an online service to post a personal message that can be distributed to any or all of the user's contacts in a billboard format. The system enables the user to enter a text message and schedule the billboard appearance and expiration for a predetermined date and time.

In operation, in embodiments of the invention, the user selects contacts for receipt of the personalized billboard. The user also selects a billboard sponsor from a pre-determined list of advertisers that have contracted with the online service to be billboard sponsors. Once submitted, the user's message appears on the selected recipients' home page along with the selected sponsored advertiser's information.

Figure 1:
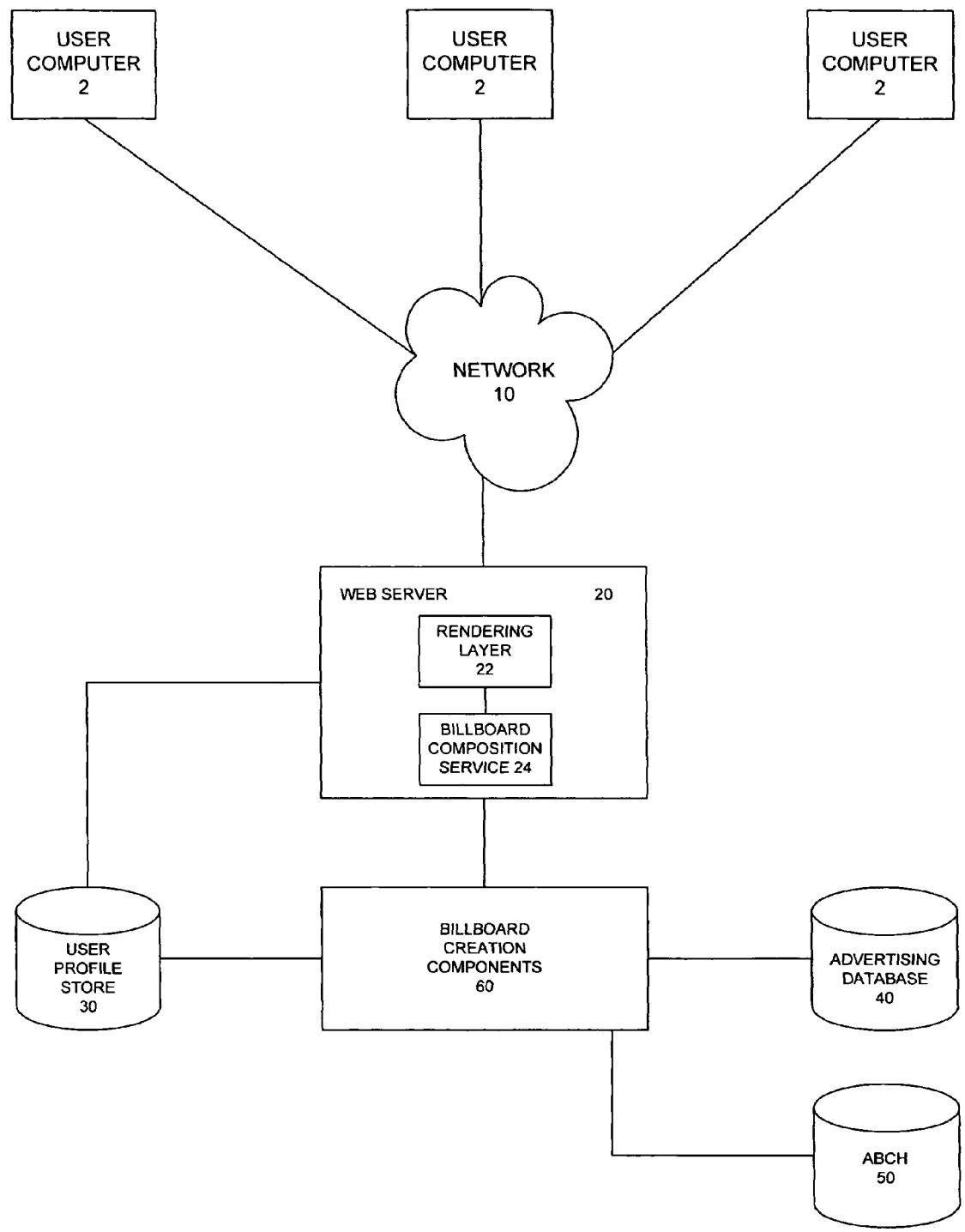
FIG. 1 is a block diagram illustrating an overview of a system in accordance with an embodiment of the invention.

As illustrated in FIG. 1, multiple user computers 2 may be connected over a network 10 with a web server 20 that delivers content for an online service. The users of the user computers 2 typically have a subscription to the provided online service provided through the web server 20. The web server 20 may include a rendering layer 22 for presentation to the user computers 2 and a billboard composition service 24 for composing the billboard that will appear on designated user computers 2. The web server 20 may be connected with a user profile store (UPS) 30 and billboard creation components 60. The billboard creation components 60 may further be connected with an advertising database 40 and address book clearinghouse (ABCH) 50. Each of these components and their functionality will be further described below.

II. Exemplary Operating Environment

Figure 2:
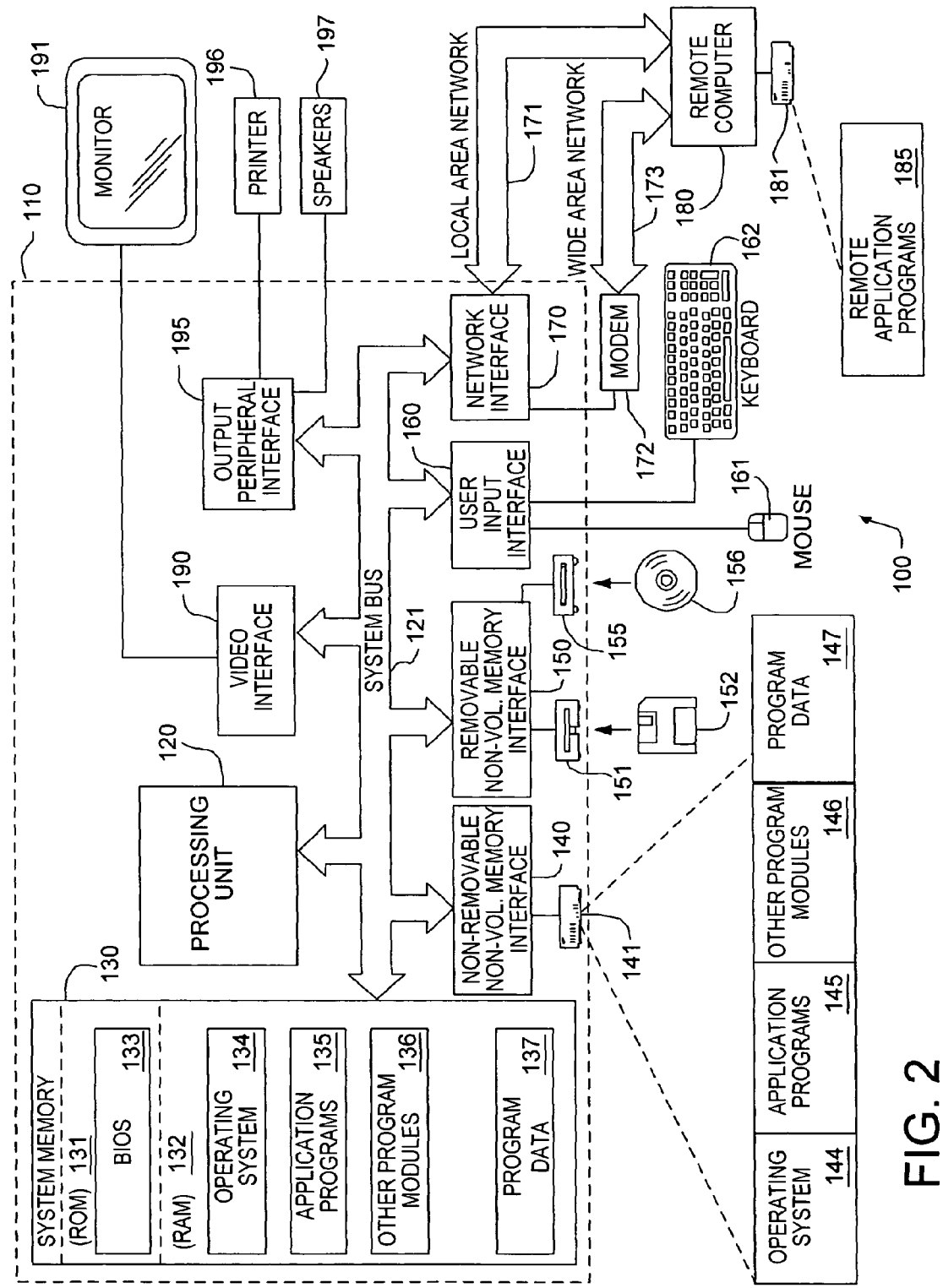
FIG. 2 is block diagram illustrating a computerized environment in which embodiments of the invention may be implemented.

FIG. 2 illustrates an example of a suitable computing system environment 100 on which the system for targeted online billboard advertising may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 2, the exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

III. System and Method of the Invention

As set forth above, FIG. 1 illustrates a system for implementing targeted online billboard advertising. As illustrated in FIG. 1, multiple user computers 2 may be connected over the network 10 with the web server 20 that delivers content for an online service. The web server 20 may include a rendering layer 22 for presentation of content to the user computers 2 and a billboard composition service 24 for composing a billboard based on user preferences. The web server 20 may be connected with the UPS 30 that contains data used for advertisement targeting and personalization. The UPS 30 may be created and maintained through the online subscription service provided by the web server 20. The web server 20 further connects with the billboard creation components 60 that forward information to the billboard composition service 24 for creating the personalized billboard advertisement to be described below. The billboard creation components 60 may further be connected with an advertising database 40 in which advertiser contact and ordering information be stored and the ABCH 50 in which all contact information may be stored.

Figure 3:
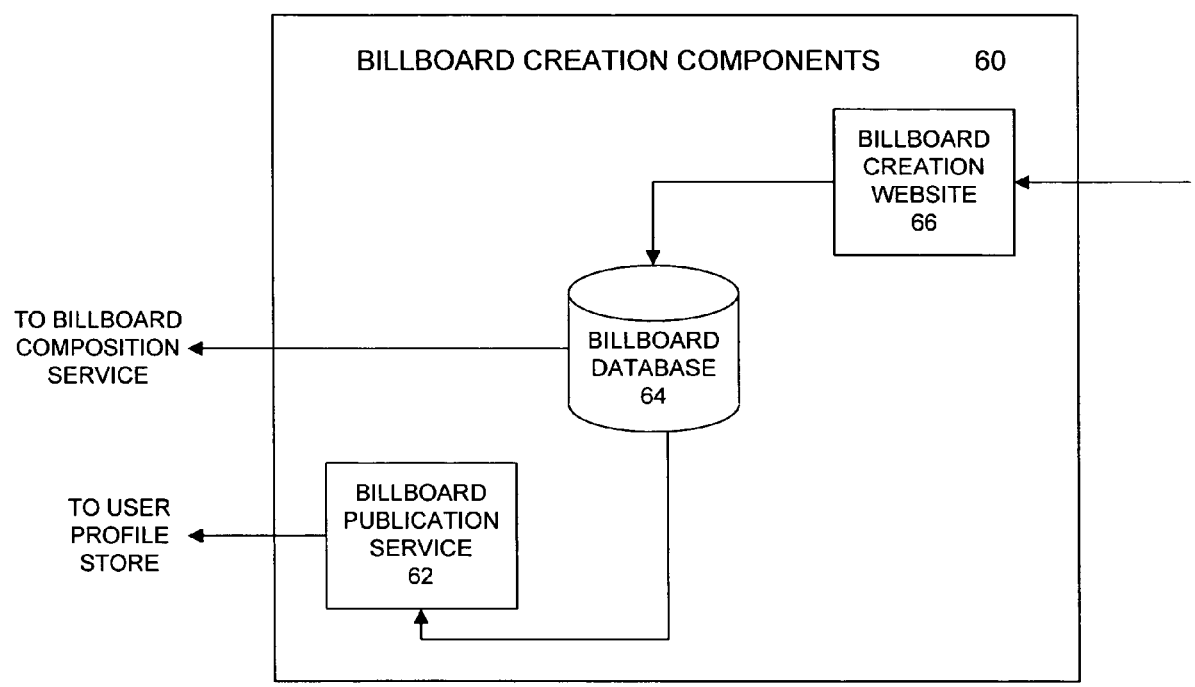
FIG. 3 is a block diagram illustrating billboard creation components in accordance with an embodiment of the invention.

FIG. 3 illustrates details of the billboard creation components 60 in accordance with an embodiment of the invention. The billboard creation components 60 may include a billboard publication service 62, a billboard database 64, and a billboard creation website 66. The billboard creation website 66 may allow the user computers 2 to select an advertiser, layout, and billboard recipients, and may additionally allow the user computers 2 to input messaging information. The billboard creation website 66 may receive input from the user computers 2 and from the advertising database 40. The billboard creation website 66 pushes information to the billboard database 64 where selected components are stored. For publication, the billboard publication service 62 may associate contact information with selected components and push information into the UPS 30. Ultimately, the billboard composition service 24 allows the online service to receive the information procured through the billboard creation components 60 and configures the information for delivery of billboards to the user computers 2.

Through the use of the above-described components the user or subscriber accessing the user computer 2 becomes a direct marketer and associates an advertising campaign with a particular online community. Thus, the advertising user serves a promotional advertisement to another potential advertiser. As a recipient of the advertisement is receiving a personal impression and an advertisement for a product, the recipient is also receiving a secondary advertisement for the billboard advertisement itself offered by the online service and may take advantage of the billboard advertisement as well. The user simultaneously markets the billboard advertisement as a product for the online service and the advertiser's brand or products for the selected advertiser.

Figure 4:
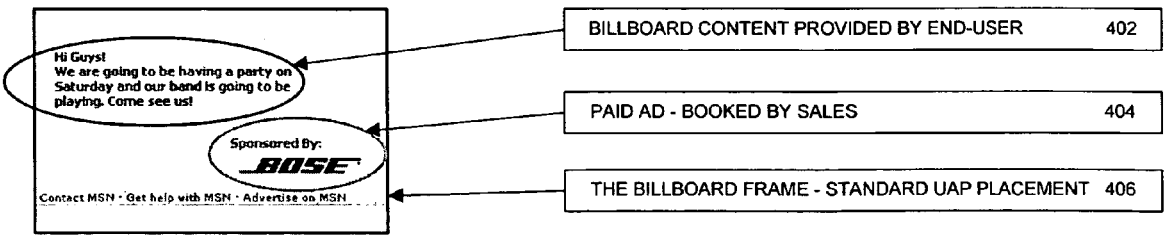
FIG. 4 illustrates a targeted billboard advertisement in accordance with embodiments of the invention.

FIG. 4 illustrates a billboard advertisement 400 that may include billboard content 402, a paid advertisement 404, and a billboard frame 406. The billboard content 402 may include a text message input by the user. The paid advertisement 404 is the brand advertiser's contribution and the billboard frame 406 is contributed by the online service. The paid advertisement 404 and the billboard frame 406 could be booked and delivered by the advertising database 40. The user component 402 of the billboard 400 may be served by the billboard creation components 60.

Figure 5:
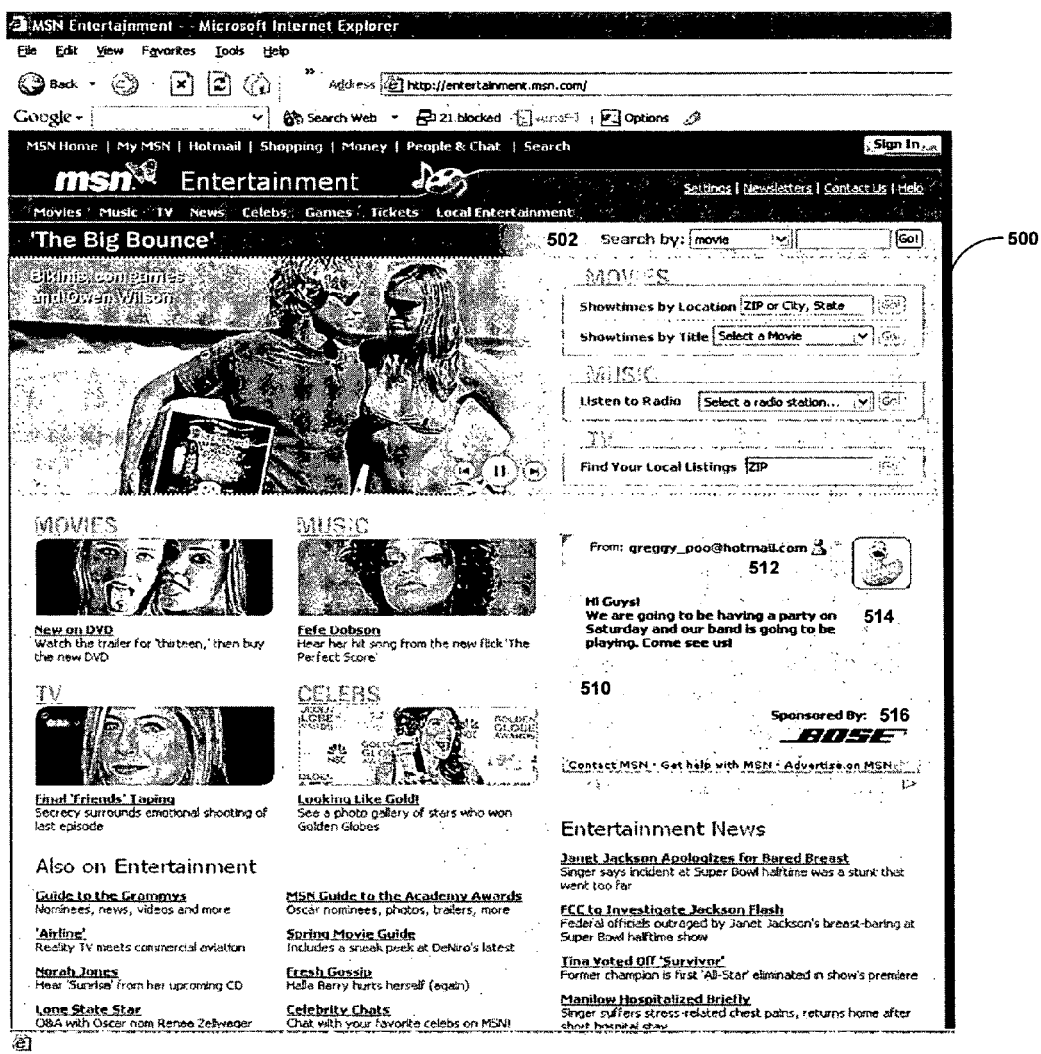
FIG. 5 illustrates placement of a targeted billboard advertisement in accordance with embodiments of the invention.

FIG. 5 illustrates a sample screen display incorporating a billboard created by the system of FIG. 1. The screen display 500 includes a main portion 502 and a billboard 510. As set forth above, the billboard 510 may include an origination address 512, a message portion 514, and a paid advertisement 516. Brand advertisers can directly engage with the user base by allowing users to illustrate identity through a user tile. The users are also able to illustrate brand association to their online community in the same environment in which advertising media is consumed.

FIG. 6 illustrates a user interface 600 that may be implemented to enable a user to create a billboard advertisement. The user interface 600 may include a message entry area 602 that enables a user to enter text from a keyboard or other input device for display. The user interface 600 may also include a billboard schedule 604 to enable a user to schedule appearance of the billboard advertisement and expiration of the billboard advertisement. The user interface 600 may also include a recipient list 606 that allows a user to designate a list of recipients for the billboard advertisement. The recipients may be selected from a list created by the user, such as a buddy list, a group list, or a general electronic mail list. The user interface 600 may also include billboard sponsor list 608 that enables a user to select one or more billboard sponsors. The billboard sponsor list 608 may be formed from advertisers that have subscribed with the online service. The online service may sell advertisers the opportunity to participate in the billboard program, which includes participation in a list of approved advertisers from which end users can directly select. If selected, the approved advertiser from the list will be included in a visual billboard targeted only at specific members of the online community. Users will select the advertisers with whom they want to associate rather than being exposed to irrelevant and untargeted advertising media. As shown in FIG. 4, an advertisement 406 for each selected billboard sponsor will ultimately appear in the created billboard 400 along with a text message 402 entered by the user.

The user-selected recipient list 606 may in some instances include a private list including an individual or specifically selected personal acquaintances. The private list technique may be targeted to a single user who is part of the online community. Similar to an email, this product is a pure form of direct marketing. The selecting user functions as an advertiser who is responsible for identifying the user being targeted and the impression to be delivered.

In other instances, the recipient list 606 may be semi-private in that a user may select a pre-configured list of recipients belonging to a specific group. Semi-private billboards are a natural extension of the private party billboard and would be targeted at all or a subset of users on the selecting user's contact and or buddy lists. The product based on a semi-private list incorporates all features of the private list billboard, but expands on the audience by allowing the users to select targeted recipients from messenger, hotmail, or other types of contact lists to target. Ideally, the semi-private list product would also provide sponsorship opportunities for brand, local advertisers and could be compelling as a pay per use subscription offering. The user data associated with the contact lists that would be utilized for user targeting are already a component of the ABCH 50.

Examples of semi-private groups may include a list of online users participating in a gaming tournament. The billboard creator may offer a prize such as a two-for-one restaurant dinner for the winner. In this instance, the restaurant would be shown as the billboard sponsor. In another scenario, the recipients include members of a family who are invited to a family reunion. The billboard could be displayed to a limited number of authorized users who have access to a family reunion web site.

In further embodiments, the user may select a list for the recipient list 606 that is created by the online service, thus creating a larger target group. For example, a user may want to display the billboard in connection with a public notification relevant to recipients in a specific location. Public announcements, obituaries, birth announcements, wedding announcements, and classified ads for services and merchandise are examples of this type of billboard advertisement. Unlike the billboard advertisements that leverage contact lists and brand sponsors, this billboard advertisement is a targeted "classified" advertisement.

For instance, an individual having a car for sale may be located in a specific city and state. The individual may want to sell the car locally and thus may provide a classified advertisement including a billboard. The online service may distribute the billboard advertisement selectively only to individuals within a twenty-mile radius of the targeted zip code.

In a further example, an individual running for public office may want to display a message to all voters in the district. The candidate may want to deliver a billboard to all people of voting age within her district that will direct them to her campaign website. As set forth above, individuals may be able to opt out of becoming a billboard recipient and thus the technique is not intrusive.

By allowing users to actively select an advertiser to sponsor each billboard message and deliver the message to selected friends, family, and contacts, the message and advertisement are targeted at a particular audience and have greater value. The receiving user will not be forced to seek out billboards that he or she has elected to receive since, in embodiments of the invention, the billboard will be displayed immediately in a session on any page to which the user navigates within the network of the online service.

Figure 7:
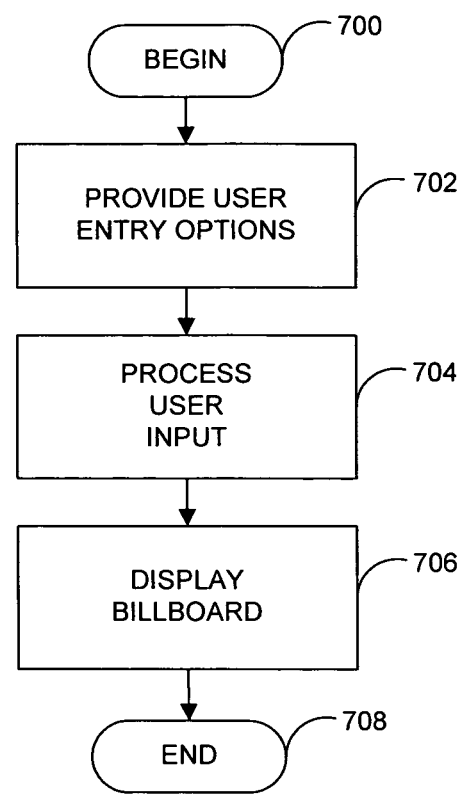
FIG. 7 illustrates a method for providing a targeted advertising system in accordance with embodiments of the invention.

FIG. 7 is a flowchart illustrating method for providing a billboard in accordance with embodiments of the invention. The method begins in step 700 and the system provides the user with entry options in step 702. The entry options preferably include those shown on the exemplary user interface 600 in FIG. 6, such as message options, scheduling options, billboard recipients, and billboard sponsors.

In step 704, the system processes the user input. In an embodiment of the processing step 704, the billboard creation website receives the user input, accesses the advertising database 40 in order to locate relevant advertiser information, and access the ABCH 50 in order to obtain contact information for selected recipients. The billboard database 64 receives billboard information from the billboard creation website 66. The billboard publication service 62 obtains billboard changes from the billboard database 64 and any blocked contacts from the ABCH 50. The UPS 30 obtains the billboard for publication from the billboard publication service 62 for the target users. The billboard composition service 24 obtains a billboard identifier from the UPS 30 and billboard details for the billboard identifier from the billboard database 64. The billboard composition service 24 matches the information obtained from the two sources to compose the billboard advertisement for rendering.

In step 706, the system displays the billboard advertisement based on the processed information. In order to provide the display, the billboard composition service 24 may forward the billboard information for rendering to the rendering layer 22. The method ends at 708.

Through the online service, the selected advertiser generates brand awareness and becomes a co-branding partner with the online service. The selected advertiser also becomes a partner with the end user because of the brand association with the identity of the end-user selecting the advertiser. The online service becomes a co-branding partner with the advertiser, as users will associate advertisement content with the online service.

The end user who composes the billboard becomes a direct marketer by specifically targeting advertising content to a friend or group of friends. The end user further creates an association between the online service, an online identity, and the advertised product or service.

The billboard recipient or end user who receives the billboard will associate an online identity with the online service and the advertised product. The billboard recipient becomes both a potential billboard consumer and a potential product consumer. In embodiments of the invention, users may opt out of participation in the billboard program. Accordingly, when received, billboards will not be viewed as unsolicited Spam by the recipient and will therefore not degrade the quality of the overall user experience.

The disclosed billboard system can benefit the online service by creating an innovative user engagement venue outside of the traditional communications services offered. The targeted advertising or billboard creation system enables identification and targeting of brand association from user to user in conjunction with a user's online identity within a trusted environment where the media is consumed. Through the user of the disclosed system, users subscribing to the online serve may become accustomed to proactively seeking privately targeted messages from their online community membership.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A computer readable medium storing computer executable instructions that when executed on a processor of a computer performs a method for providing a billboard advertisement through an online service, the billboard advertisement composed by an advertising user, the method comprising:

displaying, an interface to the advertising user at a computer, the interface including a sponsor selection mechanism for allowing selection of a billboard sponsor from a list of billboard sponsors, a target user selection mechanism for allowing selection by the advertising user of at least one target user, and a text input region for receiving an input message from the advertising user;

processing, at a web server, information input to the displayed interface of the computer to create the billboard advertisement;

composing, at the web server, the billboard advertisement including the input message and the at least one selected billboard sponsor; and rendering a web home page for the at least one target user to display the billboard advertisement, wherein the web home page is delivered to the at least one target user.

2. The method of claim 1, further comprising providing a private list selection mechanism for selection of the at least one target user, the private list selection mechanism allowing individual target user selection.

3. The method of claim 1, further comprising providing a semi-private list selection mechanism for selection of the at least one target user, the semiprivate list selection mechanism allowing selection of a pre-determined group of individuals determined by the advertising user.

4. The method of claim 3, wherein the predetermined group is an online group within an online community provided by the online service.

5. The method of claim 1, further comprising providing a public list selection mechanism for selection of the at least one target user, the public list selection mechanism allowing advertising user selection of a common characteristic of the at least one target user such that the online service is able to select a set of target users sharing the common characteristic.

6. The method of claim 5, wherein the common characteristic includes a location of residence.

7. The method of claim 1, further comprising offering through the online service, a subscription option for potential sponsors in order to be featured on the list of billboard sponsors.

8. The method of claim 1, further comprising processing input information through billboard creation components including a billboard creation website.

9. The method of claim 8, further comprising accessing an advertising database from the billboard creation website to produce the list of billboard sponsors and accessing an address book clearinghouse from the billboard creation website to obtain target user contact information.

10. The method of claim 9, further comprising storing information obtained by the billboard creation website in a billboard database.

11. The method of claim 10, further comprising implementing a billboard publication service to obtain stored information from the billboard database, obtain any blocked contacts from the address book clearinghouse, and publish the billboard advertisement to a user profile store.

12. The method of claim 11, further comprising implementing a billboard composition service to obtain a billboard identifier from the user profile store and billboard details from the billboard database, the billboard composition service composing the billboard advertisement for rendering.

13. A web server for delivering a message while simultaneously promoting a brand web server having a processor executing instructions that cause the web server to provide the online service comprising:

a sponsor selection mechanism for allowing a communicating user to select at least one sponsor from a list of provided sponsors;

a text input area for allowing the communicating user to input text for display in conjunction with the selected sponsor;

a target user selection mechanism for allowing the communicating user to select at least one target user for receipt of the selected sponsor display and the input text in a billboard advertisement, wherein the target user selection mechanism further comprises a public list selection mechanism for selection of the at least one target user, the public list selection mechanism allowing communicating user selection of a common characteristic of the at least one target user such that the online service is able to select a set of target users sharing the common characteristic that includes a location of residence;

a billboard creation website for processing input information, wherein the billboard creation website accesses an advertising database to produce the list of provided sponsors and accesses an address book clearinghouse to obtain target user contact information;

a billboard database for storing information obtained by the billboard creation website;

a billboard publication service to obtain stored information from the billboard database, obtain any blocked contacts from the address book clearinghouse, and publish the billboard advertisement to a user profile store; and a billboard composition service for obtaining a billboard identifier from the user profile store and billboard details from the billboard database, the billboard composition service composing the billboard advertisement for rendering.

14. The web server of claim of claim 13, wherein the target user selection mechanism comprises a private list selection mechanism for selection of the at least one target user, the private list selection mechanism allowing individual target user selection.

15. The web server of claim 13, wherein the target user selection mechanism comprises a semi-private list selection mechanism for selection of the at least one target user, the semi-private list selection mechanism allowing selection of a pre-determined group of individuals determined by the communicating user.

16. The web server of claim 15, wherein the predetermined group is an online group within an online community provided by the online service.

17. A billboard advertisement creation system communicatively connected to a web server executing a billboard composition service for creating personalized billboard advertisements, the billboard advertisement creation system comprising:

a billboard creation website, provided by the web server, for receiving user input including at least one selected sponsor and at least one target recipient, wherein the billboard creation website accesses an advertising database to produce a provided list of sponsors and accesses an address book clearinghouse to obtain target user contact information that includes opt-out information for each target recipient;

a billboard database for receiving created billboard information from the billboard creation website;

a billboard publication service for obtaining billboard information from the billboard database for publication; and a billboard composition service to receive the billboard information from the billboard publication service and to prepare the billboard advertisement for rendering on a web home page belonging to the targeted recipient at the target recipient's computer.

18. The billboard advertisement creation system of claim 16, wherein the billboard publication service obtains any blocked contacts from the address book clearinghouse and publishes the billboard advertisement to a user profile store.

19. The billboard advertisement creation system of claim 18, wherein the billboard composition service obtains a billboard identifier from the user profile store and billboard details from the billboard database in order to prepare the billboard advertisement for rendering.

* * * * *